Jan. 19, 1926.

T. C. FRY 1,570,215

ELECTRICAL NETWORK

Filed June 11, 1921   6 Sheets-Sheet 1

Inventor:
Thornton C. Fry.
by W. E. Beatty, Att'y.

Jan. 19, 1926. 1,570,215
T. C. FRY
ELECTRICAL NETWORK
Filed June 11, 1921 6 Sheets-Sheet 2

Inventor:
Thornton C. Fry
by W. E. Beatty, Att'y.

Jan. 19, 1926.  1,570,215
T. C. FRY
ELECTRICAL NETWORK
Filed June 11, 1921   6 Sheets-Sheet 3

Fig. 10

CUT-OFF FREQUENCY

Inventor:
Thornton C. Fry
by W. E. Beatty, Att'y.

Jan. 19, 1926.  1,570,215

T. C. FRY

ELECTRICAL NETWORK

Filed June 11, 1921  6 Sheets-Sheet 4

Inventor:
Thornton C. Fry
by W. E. Beatty, Atty.

Jan. 19, 1926.                                                    1,570,215
T. C. FRY
ELECTRICAL NETWORK
Filed June 11, 1921          6 Sheets-Sheet 5

Inventor:
Thornton C. Fry.
by W. E. Beatty, Atty.

Jan. 19, 1926.

T. C. FRY 1,570,215

ELECTRICAL NETWORK

Filed June 11, 1921

Inventor:
Thornton C. Fry
by W. E. Beatty, Atty.

Patented Jan. 19, 1926.

1,570,215

UNITED STATES PATENT OFFICE.

THORNTON C. FRY, OF WYOMING, NEW JERSEY, ASSIGNOR TO WESTERN ELECTRIC COMPANY, INCORPORATED, OF NEW YORK, N. Y., A CORPORATION OF NEW YORK.

ELECTRICAL NETWORK.

Application filed June 11, 1921. Serial No. 476,674.

*To all whom it may concern:*

Be it known that I, THORNTON C. FRY, a citizen of the United States, residing at Wyoming, in the county of Essex, State of New Jersey, have invented certain new and useful Improvements in Electrical Networks, of which the following is a full, clear, concise, and exact description.

The invention relates to electrical networks built up of impedances having values such that the networks offer a desired impedance to the flow of alternating current.

An object of the invention is to provide a network having a specified impedance. A network of this sort is applicable to the solution of several problems arising in the field of communication. There are three general types of such problems which require in their final analysis the construction of preassigned impedances. The first type arises in designing balancing networks employed in two-way repeater circuits, for example. Here the impedance to be balanced is known, and the problem is to duplicate this impedance as accurately as possible at all frequencies.

The second problem arises in adapting the impedances of two component parts of a circuit to one another so as to improve the electrical properties of the circuit in some respect, as, for instance, by reducing reflection losses. In this case the impedances of the component parts are fixed, and cannot be altered, but are different from the impedances which they should have in order to secure the most satisfactory operation of the circuit as a whole. The problem is to design a network which when combined with the original network either in series or in parallel will give to the combination the desired impedance. For instance, the added network may be in the nature of an impedance corrective net work which when combined with a wave filter of the Campbell type provides a network which has the same impedance at various frequencies.

Another problem arises in correcting for the distortion which a signal experiences in transmission through a given system by adding appropriate apparatus at either the receiving or the sending end. In this case there is provided a network having such an impedance that the output current of the distorting system when connected to this impedance will be of the same wave form as the input E. M. F. of the system.

The object of the invention is obtained, and a network of the required characteristics secured by starting with a network, the impedance of which roughly approximates the ultimate impedance desired, and adding a network section or sections, in general each different from the other and from the basic network, until a sufficiently good approximation of the impedance desired is obtained.

For further details of the invention reference may be had to the following detailed description and the accompanying drawings in which.

In the following detailed description of the invention a mathematical derivation of the nature and value of the elements of the network will be given, followed by a description of the application of the networks to the solutions of the above mentioned problems arising in the art of communication.

*The construction of networks having preassigned impedances.*

The following sections give a method of systematic design of a network having a preassigned impedance, and indicate several types of networks which fulfill the required conditions.

Figure 1:
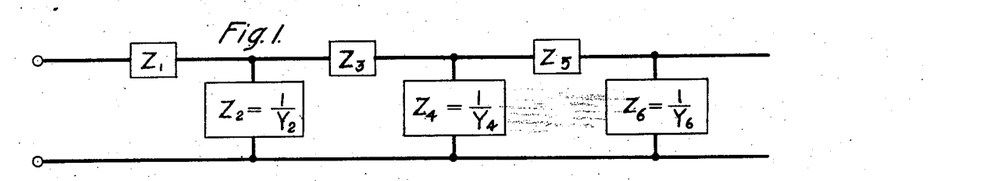
Fig. 1 illustrates the general arrangement of the network of this invention which is capable of possessing an impedance which may be expressed in the form of a continued fraction as hereinafter described.

*General theory.*—It follows from the general law of addition of impedances and admittances that the impedance of a network such as that shown in Fig. 1 of the drawings can be expressed as a continued fraction of the form $$Z = Z_1 + \cfrac{1}{Y_2 + \cfrac{1}{Z_3 + \cfrac{1}{Y_4 + \cdots}}}. \quad (1)$$

If, then, a function $F(p)$, where $p = 2\pi i$ times the frequency, $f$, can be expanded in a continued fraction, the elements of which represent possible impedances and admittances, a direct comparison of this fraction with (1) will furnish the values of the successive impedance elements in a network which will have the impedance $F(p)$.

The expansion of a function in a continued fraction of the type $$F(p) = a_0 + \cfrac{1}{a_1 p + \cfrac{1}{a_2 + \cfrac{1}{a_3 p + \cfrac{1}{a_4 + \cdots}}}}, \quad (2)$$

has been studied by Stieltjes[1] in a memoir in which he considers extensively the case where all of the coefficients are positive. Briefly stated, the method of expansion as given by Stieltjes is as follows:

The function $F(p)$ is first developed in a series in terms of descending powers of $p$, $$F(p) = a_0 + \frac{c_0}{p} - \frac{c_1}{p^2} + \frac{c_2}{p^3} - \cdots ; \quad (3)$$

which may or may not be convergent. From the coefficients of this series are built up the quantities[2]

$$A_n = \begin{vmatrix} c_0 & c_1 & c_2 & \cdots & c_{n-1} \\ c_1 & c_2 & c_3 & \cdots & c_n \\ c_2 & c_3 & c_4 & \cdots & c_{n+1} \\ \vdots & \vdots & \vdots & & \vdots \\ c_{n-1} & c_n & c_{n+1} & \cdots & c_{2n-2} \end{vmatrix}, \quad B_n = \begin{vmatrix} c_1 & c_2 & c_3 & \cdots & c_n \\ c_2 & c_3 & c_4 & \cdots & c_{n+1} \\ c_3 & c_4 & c_5 & \cdots & c_{n+2} \\ \vdots & \vdots & \vdots & & \vdots \\ c_n & c_{n+1} & c_{n+2} & \cdots & c_{2n-1} \end{vmatrix}, \quad (4)$$

The constants $a$ which appear in (2) are given in terms of $A_n$ and $B_n$ by Stieltjes by the formulæ

$$a_{2n} = \frac{A^2_n}{B_n B_{n-1}};$$
$$a_{2n+1} = \frac{B^2_n}{A_n A_{n+1}}. \quad (5)$$

If the $a$'s are all positive, a comparison between (1) and (2) gives us $Z_1 = a_0$, a resistance, $Z_2 = \dfrac{1}{a_1 p}$, a capacity, $Z_3 = a_2$, a resistance, $Z_4 = \dfrac{1}{a_3 p}$, a capacity, and so on. The network which possesses the impedance $F(p)$ is then the one shown in Fig. 2.

Stieltjes proves that the continued fraction (2) converges to the limit $F(p)$, provided all of the $a$'s are positive, and the series $$a_0 + a_1 + a_2 + \cdots$$

is divergent. This theorem has for the purpose of the discussion in hand only a limited interest, however, since many—perhaps even most—of the design problems of real importance lead, in the first instance to continued fractions having some negative elements.

One of the developments of this type which recurs frequently in filter investigations has a certain number of positive $a$'s followed by two negative, two positive, two negative, and so on. This sequence of signs may be easily dealt with by means of the identity given by Stieltjes $$Z + \cfrac{b_1}{1 + \cfrac{b_2}{\lambda}} = Z + b_1 - \frac{b_1 b_2}{b_2 + \lambda}. \quad (6)$$

[1] Annales de la Faculté des Sciences de Toulouse. Volumes VIII and IX.
[2] It is assumed that $A_0 = B_0 = 1$.

To make use of this identity the fraction (2) is reduced to the following form by dividing the numerator and the denominator of each fraction in equation (2) by the partial denominator, $$F(p) = a_0 + \cfrac{\cfrac{1}{a_1 p}}{1+\cfrac{1}{a_1 a_2 p}\Big/\left(1+\cfrac{1}{a_2 a_3 p}\Big/\left(1+\cfrac{1}{a_3 a_4 p}\Big/(1+\cdots)\right)\right)}$$

Let the first $j$ $a$'s be positive; and let the succeeding pairs alternate in sign. Then $$a_{j-1}a_j > 0, \quad (6^A)$$
$$a_j\, a_{j+1} < 0,$$
$$a_{j+1}a_{j+2} > 0,$$
$$a_{j+2}a_{j+3} < 0,$$

$$\lambda_j = 1 + \cfrac{\cfrac{1}{a_{j-1}a_j p}}{1+\cfrac{1}{\cfrac{1}{a_j a_{j+1} p}\big/\lambda_{j+2}}} = 1 + \cfrac{1}{a_{j-1}a_j p} - \cfrac{\cfrac{1}{a_{j-1}a^2_j a_{j+1} p^2}}{\cfrac{1}{a_j a_{j+1} p}+\lambda_{j+2}};$$

$\lambda_{j+2}$ denoting the remainder of the fraction. Since the term $$-\cfrac{1}{a_{j-1}a^2_j a_{j+1} p^2}$$

is positive, one of the troublesome negative and so on. That is, every second partial numerator, beginning with $$\cfrac{1}{a_j a_{j+1} p}$$

is negative. Considering the part of the fraction beginning with the partial numerator $$\cfrac{1}{a_{j-1}a_j p},$$

there results from the use of (6), interpreting Z in equation (6) as $$1,\ b_1 \text{ as } \cfrac{1}{a_{j-1}a_j p},\ b_2 \text{ as } \cfrac{1}{a_j a_{j+1} p} \text{ and } \lambda = \lambda_{j+2}$$

as the remainder of the continued fraction from the term having the partial numerator $$\cfrac{1}{a_{j+1}a_{j+2} p}$$

on, signs has been eliminated. It has, however, reappeared in the term $$\cfrac{1}{a_j a_{j+1} p}$$

in the denominator. This, however, does not necessarily give rise to any difficulties, for repeated application of the formula leads to:

$$\lambda_j = 1 + \cfrac{1}{a_{j-1}a_j p} + \cfrac{\cfrac{-1}{a_{j-1}a^2_j a_{j+1} p^2}}{1+\left(\cfrac{1}{a_{j+2}a_{j+1}}+\cfrac{1}{a_j a_{j+1}}\right)\cfrac{1}{p}+\cfrac{\cfrac{-1}{a_{j+1}a^2_{j+2}a_{j+3} p^2}}{1+\left(\cfrac{1}{a_{j+4}a_{j+3}}+\cfrac{1}{a_{j+2}a_{j+3}}\right)\cfrac{1}{p}+\cdots}} \quad (7)$$

In this form of expansion every partial numerator is positive, and every partial denominator contains a quantity of the type $$\cfrac{1}{a_{j+2q}a_{j+2q-1}}+\cfrac{1}{a_{j+2q-2}a_{j+2q-1}},$$

the first term of which is positive, the second negative. If then $$|a_{j+2q}| < |a_{j+2q-2}|, \quad (7^A)$$

all of the coefficients are positive.

Stated in words, if after a positive $a_j$ the $a$'s alternate in sign by pairs, and if the second $a$ in each pair is less in absolute value than the second $a$ in the pair preceding it, the fraction (2) can be reduced to the form (7) in which all coefficients are positive.

Throwing (7) into the form of the fraction (2), there results obtained by dividing the numerator and denominator of each fraction in succession by its numerator:

$$F(p) = a_0$$
$$+\cfrac{1}{a_1 p + \cfrac{\ddots}{\ddots + \cfrac{1}{a_{j-1}p+\cfrac{1}{a_j}+\cfrac{1}{-a^2_j a_{j+1}p - a^2_j\left(\cfrac{1}{a_{j+2}}+\cfrac{1}{a_j}\right)+\cfrac{1}{\cfrac{a^2_{j+2}a_{j+3}}{a_j^2}p+\cfrac{a^2_{j+2}}{a_j^2}\left(\cfrac{1}{a_{j+4}}+\cfrac{1}{a_{j\times 2}}\right)}}}} \quad (8)$$

in which, as has already been noted, every coefficient is positive. This expression corresponds to a network of the type shown in Fig. 3.

*Various types of networks obtained from the general theory.*

Figure 2:
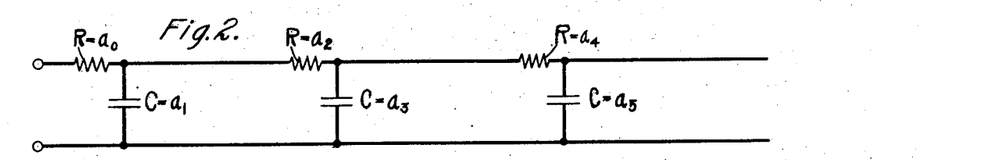
Figs. 2 to 9 illustrate specific types the general network of Fig. 1 may have.
Figure 3:
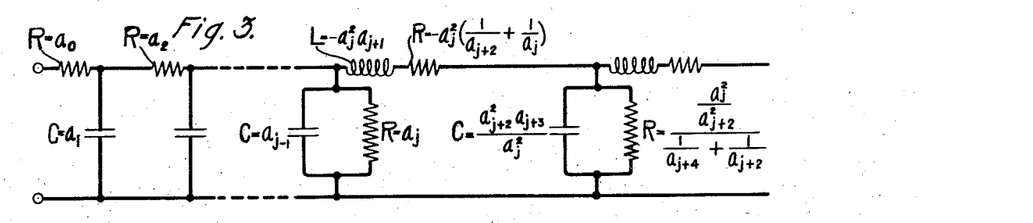

The networks of Figures 2 and 3 are not the only ones which can be obtained from the preceding general theory. To see this, consider the expansion of F ($p$) in ascending powers of $p$; that is, in a series according to Taylor's theorem $$F(p) = a_0 + c_0 p - c_1 p^2 + c_2 p^3 - \cdots \quad (9)$$

If we replace $p$ by $\frac{1}{z}$, this series is of exactly the same form as (3). Hence it can be expanded in a continued fraction (2) in terms of $z$ as shown by Stieltjes; and this can be re-written by replacing $z$ by $\frac{1}{p}$ as $$F(p) = a_0 + \cfrac{1}{\cfrac{a_1}{p} + \cfrac{1}{a_2 + \cfrac{1}{\cfrac{a_3}{p} + \cfrac{1}{a_4 + \cdots}}}} \quad (10)$$

Figure 4:
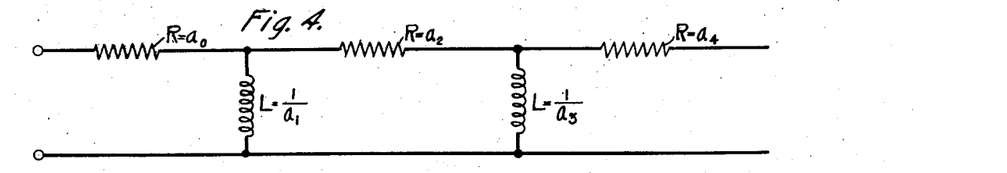

It is at once seen by comparison of (10) and (1) that this corresponds to the network shown in Fig. 4, provided all the $a$'s are positive.

Figure 5:
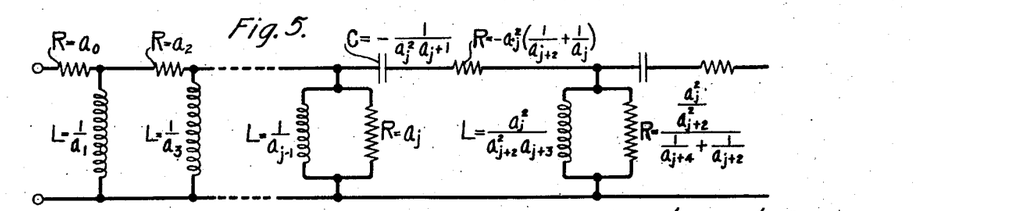

Similarly, provided the signs and absolute values of the $a$'s satisfy the set of conditions imposed in equations (6$^A$) and (7$^A$) the fraction (10) can be reduced to a form analogous to (8), but with every $p$ of (8) replaced by its reciprocal. The network corresponding to this expansion is that shown in Fig. 5.

Furthermore, four more types of network may be obtained by the process of replacing impedances by admittances. Thus, if F ($p$) represents the admittance of a network, and equation (3) its power series expansion, the continued fraction representing the impedance of the network will be obtained by equating the reciprocals of the right hand and left hand members of equation (2).

$$\frac{1}{F(p)} = \cfrac{1}{a_0 + \cfrac{1}{a_1 p + \cfrac{1}{a_2 + \cfrac{1}{a_3 p + \cfrac{1}{a_4 + \cdots}}}}} \quad (11)$$

Figure 6:
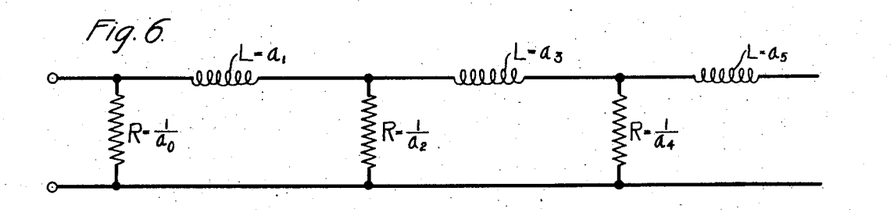
Figure 7:
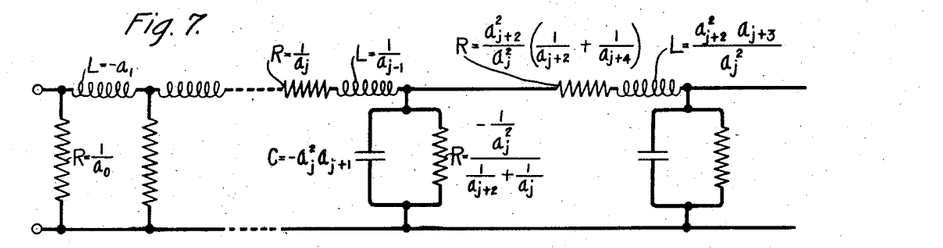

Comparing this with (1) there is obtained the network of Fig. 6, provided the $a$'s are all positive. For the other set of conditions upon the $a$'s, the network is that shown in Fig. 7. In case the first negative $a$ is $a_1$ this network degenerates into that of Fig. 3.

Figure 8:
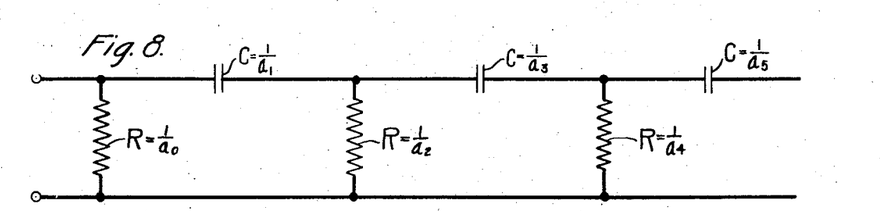
Figure 9:
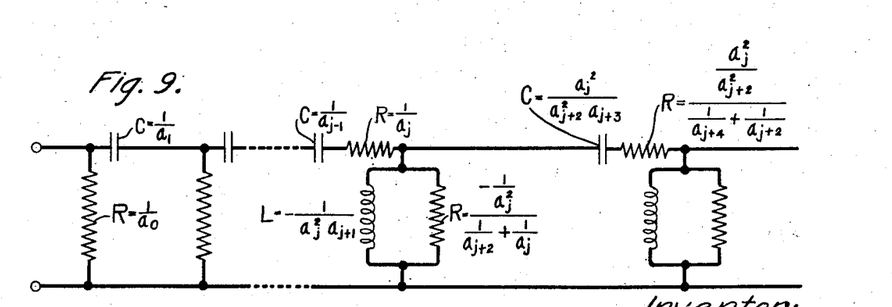

Similarly, for the expansion of the admittance in ascending powers of $p$, the networks of Figures 8 and 9 are obtained. Under special circumstances, the networks of Fig. 5 and Fig. 9 may be alike.

This concludes the purely theoretical part of the method of design as at present developed. We shall now take up in detail the three uses which were suggested above as typical of the fields in which the networks disclosed in this application are of value. In order that the illustration may be as complete as possible we shall compute in each case a specific numerical problem which will serve the purpose of explaining how the magnitudes of the impedance elements, from which the networks are constructed, can be obtained.

*Balancing networks.*

It will be convenient in this portion of the specification to use the notation adopted and adequately explained in a paper by the inventor entitled "The solution of circuit problems", which appeared in the Physical Review, Vol. 14, August 1919. In this notation the impedance of a smooth line is $$Z(p) = \sqrt{\frac{p+1}{p+k}}$$

where $k$ equals $$\frac{KL}{CR}$$

where K, L, C and R are the shunt conductance, the inductance, the capacity and the resistance per unit section of a smooth transmission line if the line is so long that the amplitude at the sending end of currents reflected from the receiving end is negligibly small. Let us design networks of the types shown in Figs. 2 and 8 to balance such a line.

For the purpose of obtaining a network of the type shown in Fig. 2, it is necessary to expand the impedance function in a Taylor's series in descending powers of $p$. Such a series is readily obtained by the use of the binominal formula and is found to be $$Z(p) = 1 + \sum_{g=1}^{\infty} \frac{c_{g-1}}{p^g},$$

where $c_{g-1}$, the coefficient of the term in $\frac{1}{p^g}$, is given by the formula $$c_{g-1} = \sum_{j=0}^{g} \frac{\Gamma\left(\frac{3}{2}\right)\Gamma\left(\frac{1}{2}\right)k^{g-j}}{\Gamma(j+1)\Gamma\left(\frac{3}{2}-j\right)\Gamma(g-j+1)\Gamma\left(\frac{1}{2}-g+j\right)}.$$

The symbol $\sum_{g=1}^{\infty}$ represents the summation of the expression given from values of $g=1$ to $g=\infty$. The symbol $\Gamma$ is the gamma function well known to mathematicians and tabulated in many places as for instance Jahnke and Ende on "Funktionentafeln mit Formeln und Kurven," B. G. Teubner, Leipzig.

When these $c$'s are substituted in equations (4) and (5) it is found by direct evaluation that $$a_{2n} = \frac{2(1-k)^{2n-1}}{\left[\sum_{m=0}^{n} C_{2m}^{2n+1} k^m\right]\left[\sum_{m=0}^{n-1} C_{2m}^{2n-1} k^m\right]},$$

$$a_{2n+1} = \frac{2\left[\sum_{m=0}^{n} C_{2m}^{2n+1} k^m\right]^2}{(1-k)^{2n+1}}.$$
(12)

The symbod $C^a_b$ signifies the number of combinations of "$a$" things taken "$b$" at a time.

These $a$'s are the ones in terms of which the resistance and capacity elements of the network of Fig. 2 are expressed. When they are given the values assigned to them by equation (12) the network of Fig. 2 will, according to the theory which we have developed, have exactly the same impedance for all frequencies as has the smooth line which it is designed to simulate. Theoretically, of course, the network required to produce this result contains an infinite number of sections. However, the networks obtained by using only a limited number of sections have approximately the same impedance as has the infinite network itself. That this is true can be inferred from the fact that sections at any considerable distance from the input end of the network cannot ordinarily influence its impedance to any great extent. Computations have been carried out and laboratory tests have been made of networks having a relatively small number of sections and both have indicated that the number of sections required to obtain a reasonably good agreement between the impedance of the network and that of the line which it is designed to simulate is not large.

Of course, when any finite number of sections whatever is used a certain residual unbalance must remain. What actually happens is that as the number of sections is progressively increased this residual unbalance decreases continually. In practice the minimum number of sections which will suffice to furnish any required degree of balance may be found by determining either by computation or by laboratory measurement the impedances of networks of various numbers of sections and noting under what circumstances the difference between these impedances and that of the smooth line which is to be balanced falls within the allowable limits.

It not infrequently happens that the circuit requirements are such that a greater amount of unbalance is allowable at certain frequencies than at others. Such requirements must, of course, be taken into account in determining how complex a structure to build. They are also frequently of importance in determining which of the various types of networks disclosed in Figs. 2 to 9 is most suitable for the purpose at hand. This is illustrated to some extent by the network which we have just obtained and the network of the type shown in Fig. 8 for which the $a$'s will presently be computed. A little consideration of the structure of the networks of Fig. 2 serves to show that the convergence of the impedances of networks of successively greater numbers of sections toward the limiting impedance of the infinite network is much more rapid at high than at low frequencies. On the other hand the convergence in the case of networks of the type shown in Fig. 8 is more rapid at low than at high frequencies. Hence while any requirements whatever as to the degree of balance to be obtained can be satisfied by using a network of the type shown in Fig. 2 having a sufficient number of sections, it is altogether possible, particularly where low frequencies are of considerable importance, that a smaller number of sections of the type shown in Fig. 8 will serve the purpose equally well. As a second example, then, let us find the elements necessary for the construction of this kind of structure.

For this purpose it is necessary to expand the admittance, $$\frac{1}{Z} = \sqrt{\frac{p+k}{p+1}}$$

in a series in ascending powers of $p$. The series thus found by the binomial expansion theorem is $$\frac{1}{Z} = \sqrt{k}\left(1 + \sum_{g=1}^{\infty} c_{g-1} p^g\right),$$

where the coefficient of the term in $p^g$ is $$c_{g-1} = \sum_{j=0}^{g} \frac{\Gamma\left(\frac{3}{2}\right)\Gamma\left(\frac{1}{2}\right) k^{-j}}{\Gamma(j+1)\Gamma\left(\frac{3}{2}-j\right)\Gamma(g-j+1)\Gamma\left(\frac{1}{2}-g+j\right)}.$$

By making use of these constants in the computation of the determinants $A_n$ and $B_n$ and proceeding in exactly the same manner as in the preceding illustration we arrive at the expressions:

$$a_{2n} = \frac{2\sqrt{k}(1-k)^{2n-1}}{\left[\sum_{m=0}^{n} C_{2m}^{2n+1} k^m\right]\left[\sum_{m=0}^{n-1} C_{2m}^{2n-1} k^m\right]}, \quad (13)$$

$$a_{2n+1} = \frac{2\sqrt{k}\left[\sum_{m=0}^{n} C_{2m}^{2n+1} k^m\right]^2}{(1-k)^{2n+1}},$$

for the coefficients of the various terms of our continued fraction.

These constants determine the sizes of the impedance elements from which the network indicated schematically in Fig. 8 is to be constructed. This network is theoretically infinite, as was the case with the network of Fig. 2, and when used in this form it also possesses an impedance which agrees absolutely with that of the smooth line at all frequencies. Which type is to be used must be determined, as was explained above, by the physical requirements to be imposed upon the apparatus.

All of the computed values of the impedance elements for both types of structure are expressed in the theoretical system of units to which reference was made at the beginning of this section. In order to reduce them to practical units it is only necessary to make use of the following four relations, in which R, L, C and K are the resistance, inductance, capacity and leakage of the line per unit length:

(1) The practical unit of resistance is $$\sqrt{\frac{C}{L}}$$

times as great as the theoretical unit: and therefore the resistance of any part of a circuit in practical units is $$\sqrt{\frac{L}{C}}$$

times the resistance of the same part of the circuit in theoretical units.

(2) The practical unit of inductance is $$\frac{R}{L}\sqrt{\frac{C}{L}}$$

times as great as the theoretical unit and therefore the inductance of any part of a circuit in practical units is $$\frac{L}{R}\sqrt{\frac{L}{C}}$$

times the inductance of the same part of the circuit in theoretical units.

(3) The practical unit of capacity is $$\frac{R}{\sqrt{LC}}$$

times as great as the theoretical unit and therefore the capacity of any part of a circuit in practical units is $$\sqrt{\frac{LC}{R}}$$

times the capacity of the same part of the circuit in theoretical units.

(4) The quantity $k$ is KL/CR.

It is probably wise to point out, before concluding this section of the specification, that the impedance of any smooth line whatsoever for which R, L, C and K do not vary with the frequency is expressed by the function Z of which we have made use in the preceding paragraphs. The differences between the behavior of such lines may, of course, be numerous but these differences are taken account of entirely by the fact that the theoretical system of units in terms of which all of the computations have been made depends upon the line constants of the particular line under consideration and therefore itself varies from line to line. Thus the networks which we have obtained are perfectly general and apply to all smooth lines provided only that the proper factor be used in converting the computed resistances and capacities from the theoretical to practical units.

*Impedance corrective networks.*

In developing a system of circuits to perform certain special functions it is not infrequently desirable that the complete system or parts of it should possess an impedance which varies in some special manner with the frequency.

Suppose that such a problem exists and that a network, which satisfies every requirement except that as to impedance, has been obtained. It then becomes necessary to modify the design in such a way as to fulfill the last condition. How this can be done by the addition of a corrective network having no other purpose than that of giving the circuit the desired impedance will now be shown.

Suppose the impedance of the network as designed is $Z_n$ and that the desired impedance is $\overline{Z}$; each of these of course being allowed to vary in any physically possible manner with the frequency. By adding an auxiliary network with an impedance $Z_c = \overline{Z} - Z_n$ in series with $Z_n$ itself a combination is obtained the impedance of which is $\overline{Z}$. Hence, in order to satisfy the requirements of the problem it is only necessary to find a network having the impedance $Z_c$. This can, of course, be done by the methods explained in the earlier sections.

Similarly by bridging across the terminals of $Z_n$ an impedance $$Z_o = \frac{Z_n \bar{Z}}{Z_n - \bar{Z}},$$

a shunt combination is obtained of which the impedance is $\bar{Z}$. Hence, it is also possible by designing a network with this impedance $Z_o$ to satisfy the requirements of the problem.

Figure 11:
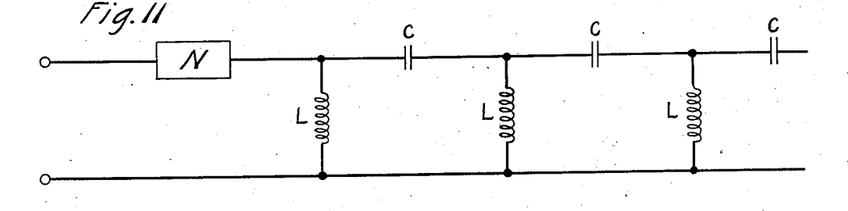
Fig. 11 shows how an impedance corrective network according to this invention may be added to a wave filter to form a constant impedance arrangement.

As an example of networks to be placed in series with the impedances which they are required to correct let us consider the design of a corrective network for a simple high pass filter of the Campbell type. Such a filter is shown in Fig. 11, with the corrective network N connected in series. If the entrance to such a filter is by means of a full shunt element its impedance $$Z = \frac{1}{\frac{1}{RLp} + \frac{1}{Z + \frac{1}{Cp}}}$$

since the impedance, $Z$, of a network of a very large number of sections, each comprising a shunt inductance, L, a shunt resistance, R, and a series capacity, C, may be regarded as the impedance of a single section terminated by the impedance Z, so that the impedance of the whole network may be written by equating Z equal to the sum of admittances of the two paths, one including L and R and the other including C and Z. Solving the equation just given for Z we get $$Z_n = \frac{1}{2Cp}\left[-1 \pm \sqrt{4(R + Lp)Cp + 1}\right].$$

Figure 10:
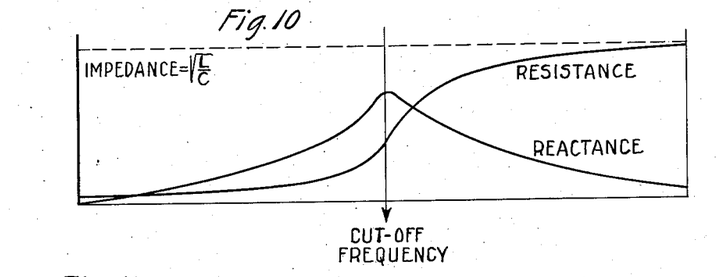
Fig. 10 represents curves showing the impedance characteristics of a high pass wave filter.

This varies widely with frequency as is shown by the typical curves of Figure 10. Such a variation of impedance is frequently undesirable and a network which will reduce it to a constant resistance is highly desirable.

Suppose we desire to make the resistance of the combination equal to the characteristic impedance.

$$\sqrt{\frac{L}{C}}$$

of the filter. That is, we wish to have $$\bar{Z} = \sqrt{\frac{L}{C}},$$

as shown in the dotted line of Fig. 10. It then becomes necessary to find a network of which the impedance is $$Z_o = \bar{Z} - Z_n.$$

By expanding this function in descending powers of $p$ by means of the binomial theorem and from the coefficients thus obtained from equations (4) and (5), we obtain the following continued fraction $$Z_o = \bar{Z} - \sqrt{\frac{L}{C}} + \cfrac{1}{a_1 p\sqrt{\frac{C}{L}} + \frac{K}{2}\sqrt{\frac{C}{L}} + \cfrac{1}{\sqrt{\frac{L}{C}}\left[\frac{4 a_1 p}{K} - \frac{2}{K} + 2\right] + \cfrac{1}{\ddots}}}$$

where $$K = \frac{R\sqrt{C} + \sqrt{L}}{\sqrt{L} - R\sqrt{C}}$$

and $$a_1 = \frac{2L\sqrt{C}}{\sqrt{L} - R\sqrt{C}}.$$

Figure 12:
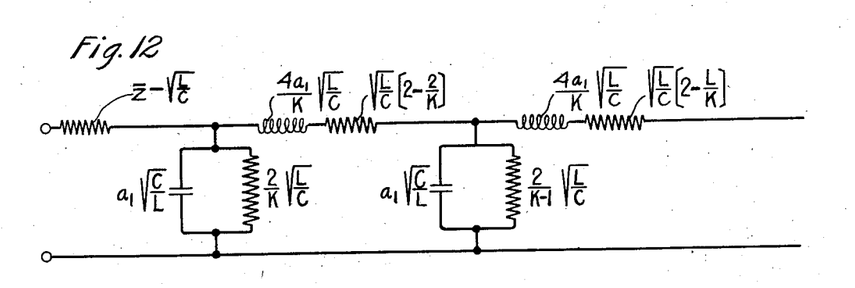
Figs. 12 and 13 illustrate specific forms of corrective networks which may be employed in Fig. 11.

To this corresponds the network shown in Figure 12.

This network when connected in series with the filter as shown in Fig. 11 accurately corrects the impedance of the filter for all frequencies whatever the values of R, L and C. If, however, L is less than $R^2C$ some of the values assigned to the resistances are negative, that is, resistances such that the current flow through them is proportional to the electromotive force across them, but in a direction which transfers positive electricity from the point of low potential to that of high potential. Since such negative resistances are not at present available it is not physically possible to construct the network when this relation exists between the constants L, R and C. A network which can be constructed, however, when L is less than $R^2C$ may be obtained by the expansion of $Z_o$ in ascending powers of $p$. This expansion is carried out by means of the binomial theorem and when its coefficients are substituted in equations (4) and (5) leads to the continued fraction $$Z_o = \bar{Z} - R + \cfrac{1}{\cfrac{a_1}{p} + \cfrac{1}{a_2 + \cfrac{1}{\ddots}}},$$

where $$a_1 = \frac{1}{R^2C - L}, \quad a_2 = \frac{R^2C - L}{2RC}, \quad a_3 = \frac{2Ra_1}{a_2}, \quad a_4 = \frac{a_2}{a_1(3R^2C + L)}, \text{ etc.}$$

Figure 13:
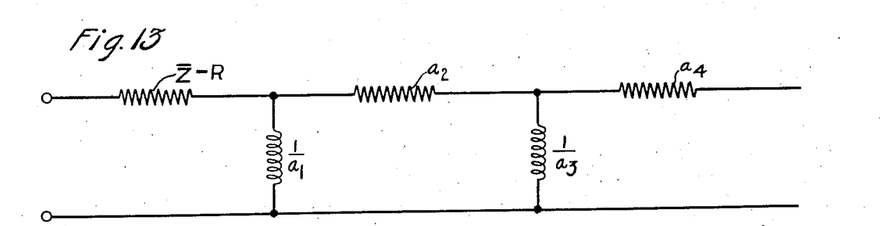

This leads, therefore, to the network of Figure 13, which, when placed in series with the filter, as shown in Fig. 11, accurately corrects the impedance at all frequencies.

Similar networks can be designed for almost any type of impedance correction, that is, for given impedances $Z_n$ and desired impedances $\bar{Z}$ which vary in almost any manner whatsoever with frequency. Of course, it may happen as in the first example above for $L$ less than $R^2C$ that negative resistances, inductances or capacities are involved in the design. When this occurs it indicates that the conditions are such that they cannot be satisfied by any network of the type under consideration which is composed only of such elements as are available. Under these circumstances it is necessary to investigate the possibility of the use of other types of networks as was done in the example above. Since the actual computation of the impedance elements out of which the network is to be constructed involves a considerable amount of algebraic and arithmetical work, it is highly desirable to have a method of eliminating in advance those types of network which cannot satisfy the conditions of the problem without the use of negative impedance elements. How this may be done can best be illustrated by the consideration of a special case.

Figure 14:
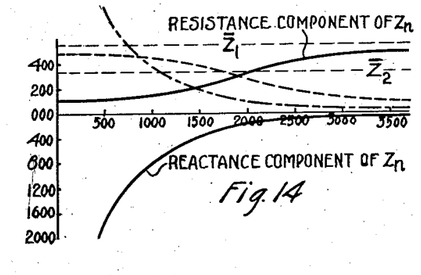
Fig. 14 illustrates curves showing the impedance characteristics and Fig. 15 the admittance characteristics of a network, the characteristics of which it is desired to make more constant with frequency.

Suppose the impedance which is to be corrected is that shown in Figure 14 and that some means is sought of altering the system giving rise to this impedance in such a manner as to give the altered system a pure resistance. We wish to determine which of the network types of Figures 2 to 9 can be used for this purpose.

Attention is called to the fact that the reactance component of the impedance to be corrected is very large and negative at low frequencies. If, therefore, the corrective network were to be placed in series with the impedance to be corrected it would be necessary that the impedance of the corrective network have an equally large but positive reactance component. But it is well known that physical systems composed only of positive resistances, inductances and capacities cannot give rise to a reactance component which varies in this manner with the frequency. Hence we may conclude that no corrective network can be obtained which, when attached in series with the impedance shown in Figure 14, yields a combination which has an impedance equal to a pure resistance.

Figure 15:
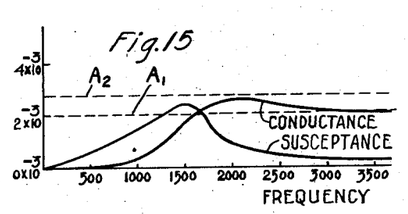

If the corrective network is to be attached in parallel with the filter network then it is the admittance which is of importance. Let us, therefore, consider the admittance curves, which are shown in Figure 15, and investigate whether or not any of the types of networks shown in Figures 2 to 9 are more advantageous than others.

Suppose that the desired admittance $$\frac{1}{\bar{Z}}$$

is represented by the dotted line marked $A_1$. In order that this admittance may be realized it is necessary in the first place that the susceptance of the corrective network shall be equal to the susceptance shown in Figure 15 but opposite to it in sign, and in the second place that the conductance of a corrective network shall be of just such a magnitude at each frequency as to build the conductance curve of Figure 15 up to the line $A_1$. Since in the neighborhood of the frequency 2,000 the conductance curve lies above $A_1$, this would require that the conductance of the corrective network be negative in the neighborhood of this frequency. Now it is well known that no network composed entirely of positive resistances, inductances and capacities ever gives rise to a negative conductance. We must, therefore, infer that there is no type of network which can satisfy the conditions laid down.

If, however, the admittance $$\frac{1}{\bar{Z}}$$

is that represented by $A_2$ this objection does not apply and a network involving positive elements only may be obtained.

Let us now consider one or two of the network types shown in Figures 2 to 9 and see whether they possess in the neighborhood of zero frequency the proper type of admittance to correct the curves of Figure 15 in the desired manner. Consider first the network of Figure 2. A little investigation serves to show us that both the conductance and susceptance of this network approach zero as zero frequency is approached. Moreover, the sign of the susceptance is positive. Neither of these values is satisfactory since the network which is needed to correct the impedance curve of Figure 15 must have a finite conductance and a small but negative susceptance. In the case of the network shown in Figure 3 the conductance component is finite at zero frequencies but the susceptance is still positive. This network, therefore, is also unsatisfactory for our purposes. On the other hand the network shown in Figure 4 has a finite conductance and a small negative susceptance at very low frequencies and, therefore, fits in with our needs. A consideration of its behavior at very large frequencies shows that it is satisfactory in that respect also and it is, therefore, probable that a network of this type can be so designed as to satisfy all the requirements which we have laid down.

The impedance curves of Figures 14 and 15 are of no consequence except in so far as they serve to illustrate the sort of argument by means of which certain types of networks may be eliminated from consideration and the actual computation restricted to those which give promise of requiring only positive elements. There is, therefore, no further need of considering these curves and we shall pass on to a consideration of certain novel arrangements of balancing networks.

*Impedance corrective networks for smooth lines.*

In an earlier division of this specification the construction of balancing networks for smooth lines was considered in some detail. The present section will be devoted to a consideration of some impedance corrective networks for such lines.

As a first example let us consider the expansion of $Z(p)$ from the first equation appearing under the above section entitled "Balancing networks" in a series in ascending powers of $p$. This expansion is carried out by the binomial theorem and leads to $$Z(p) = \frac{1}{\sqrt{k}}\left[1 + \sum_{g=1}^{\infty} c_{g-1} p^g\right],$$

where $$c_{g-1} = \sum_{j=0}^{g} \frac{\Gamma\left(\frac{3}{2}\right)\Gamma\left(\frac{1}{2}\right) k^{j-g}}{\Gamma(j+1)\Gamma\left(\frac{3}{2}-j\right)\Gamma(g-j+1)\Gamma\left(\frac{1}{2}-g+j\right)}.$$

This leads to a continued fraction of the form $$Z = \frac{1}{\sqrt{k}} - \cfrac{1}{\cfrac{a_1}{p} + \cfrac{1}{a_2 + \cdots}},$$

in which the coefficients are found from the direct evaluations of equations (4) and (5) to be given by the general formulae $$a_{2n} = \frac{2\left(\frac{1-k}{k}\right)^{2n-1}}{\sqrt{k}\left[\sum_{m=0}^{n} C_{2m}^{2n+1} k^{-m}\right]\left[\sum_{m=0}^{n-1} C_{2m}^{2n-1} k^{-m}\right]}; \quad (14)$$

$$a_{2n+1} = \frac{2\sqrt{k}\left[\sum_{m=0}^{n} C_{2m}^{2n+1} k^{-m}\right]^2}{\left(\frac{1-k}{k}\right)^{2n+1}}.$$

Let us now investigate the possibility of adding to this line in series a network which will correct its impedance to the value $$\bar{Z} = \frac{1}{\sqrt{k}}.$$

The impedance of the corrective network must then be $$\bar{Z} - Z(p) = Z_c = \cfrac{1}{\cfrac{a_1}{p} + \cfrac{1}{a_2 + \cfrac{1}{\cfrac{a_3}{p} + \cdots}}}$$

This corresponds to a network of the type shown in Figure 4 in which $a_0$ is to be given the value zero and the remainder of $a$'s the values written above.

Figure 16:
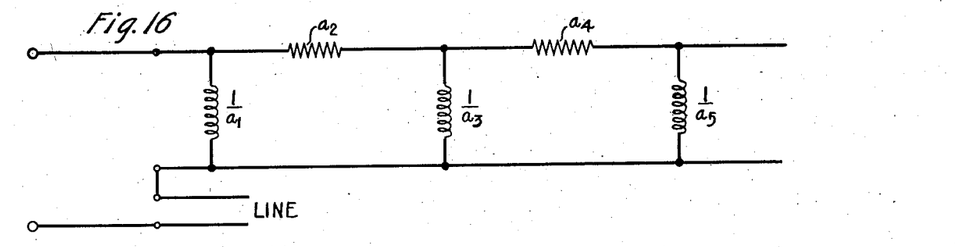
Fig. 16 shows a corrective network of the form of Fig. 4 connected in series with a line.

When such a network is combined in series with the transmission line as shown in Figure 16 the resulting combination has at all frequencies the impedance $$\frac{1}{\sqrt{k}}.$$

In practice $k$ is always very small so that all the coefficients in the continued fraction and therefore all the impedance elements of Figure 16 are positive and the network can actually be constructed of impedance elements which are physically obtainable.

As a further illustration we may consider the expansion of $$\frac{1}{Z(p)}$$

in descending powers of $p$. When this expansion is carried out by the binomial theorem and (4) and (5) are evaluated it is found to result in a continued fraction $$\frac{1}{Z(p)} = 1 - \cfrac{1}{a_1 p + \cfrac{1}{a_2 + \cdots}},$$

in which $$a_{2n} = \frac{2\left(\frac{1-k}{k}\right)^{2n-1}}{\left[\sum_{m=0}^{n} C_{2m}^{2n+1} k^{-m}\right]\left[\sum_{m=0}^{n-1} C_{2m}^{2n-1} k^{-m}\right]}, \quad (15)$$

$$a_{2n+1} = \frac{2k\left[\sum_{m=0}^{n} C_{2m}^{2n-1} k^{-m}\right]^2}{\left(\frac{1-k}{k}\right)^{2n+1}}.$$

If we attempt to find a network which, when placed in parallel with the line, will yield a combination having the impedance $\bar{Z}=1$ we find that the impedance of this corrective network must be represented by the continued fraction $$Z_0 = a_1 p + \cfrac{1}{a_2 + \cfrac{1}{a_3 p + \cdots}}.$$

This network is of the type shown in Figure 6, $a_0$ being zero and the remainder of the $a$'s having the values assigned to them above. All of these constants are positive when $k$ is sufficiently small, from which fact it follows that this network also can be constructed of impedance elements which are physically obtainable.

It is scarcely necessary to remark that all these computations have been carried out in the special system of units introduced in the section on Balancing networks and can be reduced to ordinary units by the rules given in that place.

We have thus found in the present section two networks either one of which will serve the purpose, when placed in combination with a smooth line, of rendering the impedance of the combination equal to a pure resistance of the same value at all frequencies.

*Application of impedance corrective networks to balancing problems.*

The idea involved in most balancing systems is essentially the same; namely, to build up a bridge arrangement having for one of its arms the transmission line or cable, for another arm a network which simulates as closely as possible the impedance of the line or cable, and for the remaining arm two impedance elements similar to one another but different from the other pair. Signals arriving over the line are detected by means of a receiving apparatus connected between the points at which dissimilar arms meet, while outgoing signals are impressed upon the system by means of voltages applied between the points at which similar arms meet.

It is equally possible, however, to use as one arm of the bridge the combination of the line or cable and an impedance corrective network of either the shunt or series type so designed as to give to this arm an impedance equal to a pure resistance at all frequencies. The remainder of the bridge will then consist of a resistance element equalling the resistance of the arm in which the line occurs and two other arms similar to one another but not to the first pair mentioned.

Figure 17:
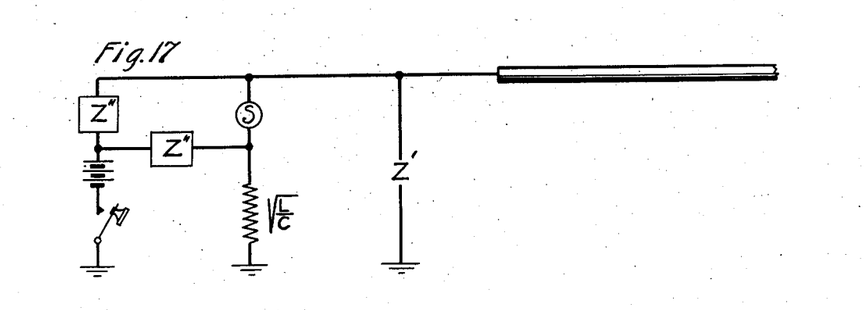
Fig. 17 shows how this invention may be employed in cable duplexing.

Thus in the case of cable duplexing, which may be taken as typical, the arrangement would be that shown in Figure 17 if the impedance corrective element of the shunt type is used.

In this figure the arms marked $Z''$ are the finite bridge arms, which in the present commercial systems of cable signaling are condensers; S is the receiving apparatus; $Z'$ is the impedance corrective network and the resistance $$\sqrt{\frac{L}{C}}$$

is the fourth arm of the bridge.

Figure 18:
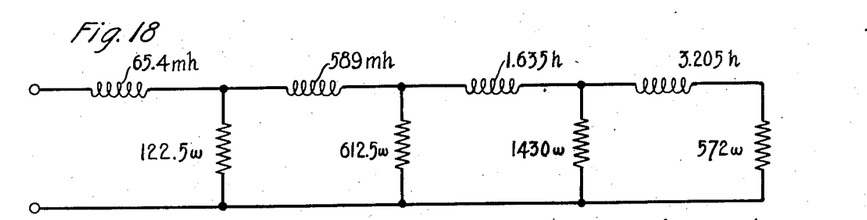
Fig. 18 represents particular values a corrective network for Fig. 17 may have.
Figure 21:
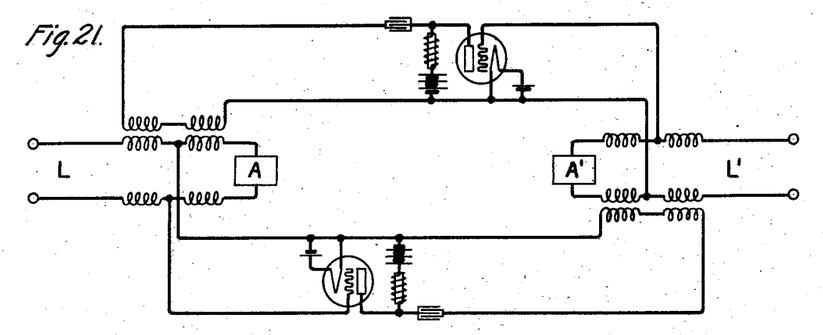
Figs. 21, 22 and 23 illustrate three different ways the corrective network of this invention may be employed in the balance of signaling lines to provide two-way repeater operation.
Figure 22:
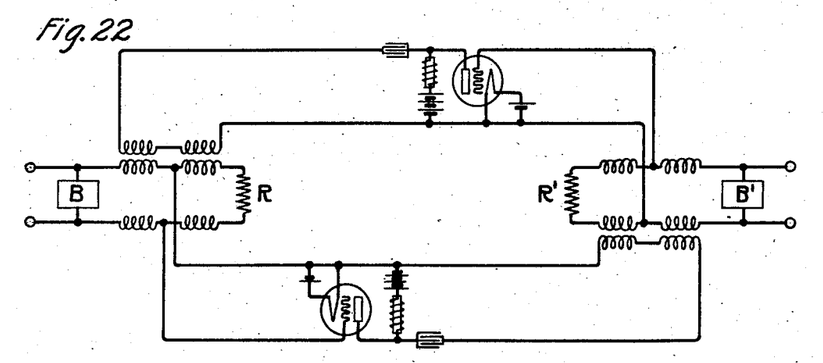
Figure 23:
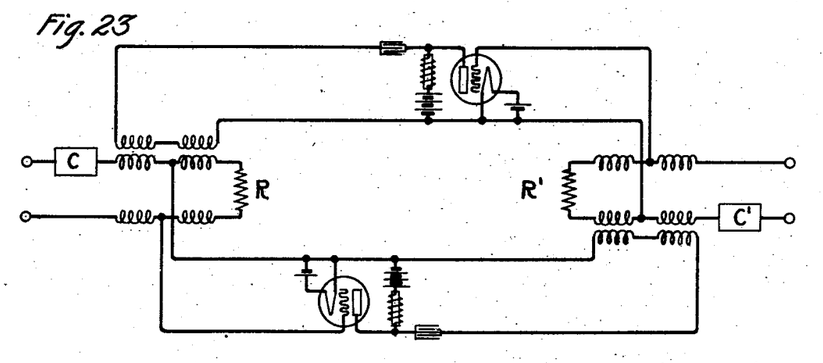

In order to gain an impression of the degree of balance which may be obtained from such a system let us consider as a numerical case a cable having the constants R=5 ohms, C=0.3 microfarads, L=2 millihenrys and K=0 per mile. Assuming that a network of four sections will give a sufficiently accurate correction the values of the four sections should be in the assumed case as shown in Fig. 18. With exception of the resistance marked 572 ohms, the elements have been assigned values according to the above equations holding for the case where a very large number of sections were to be employed. According to these formulæ the fourth resistance from the left would have a value of 2570 ohms if other sections of the network were to be added. In such a case as given above however where only a few sections, four for example, are to be employed, the last shunt element instead of corresponding to the formula, may be so constructed as to have an impedance equal to the impedance of the remainder of such a network of infinite number of sections for some one frequency. If for the purpose for which the network is desired, an especially accurate balance is required at some one frequency or within some band of frequencies, as for example, within the voice range in the case of the particular embodiments shown in Figs. 21, 22, 23, this one frequency, or a frequency within this band of frequencies will preferably be chosen as that at which the last shunt element shall match the impedance of the remainder of the infinite network. This observation regarding the termination of the network of Fig. 18 applies equally well to the other types of networks illustrated in the attached drawings. Since the network of Fig. 18 has been illustrated for a d.c. telegraph system it may be easily calculated from the above equations that the last shunt resistance of Fig. 18 should have a value of 572 ohms.

Figure 19:
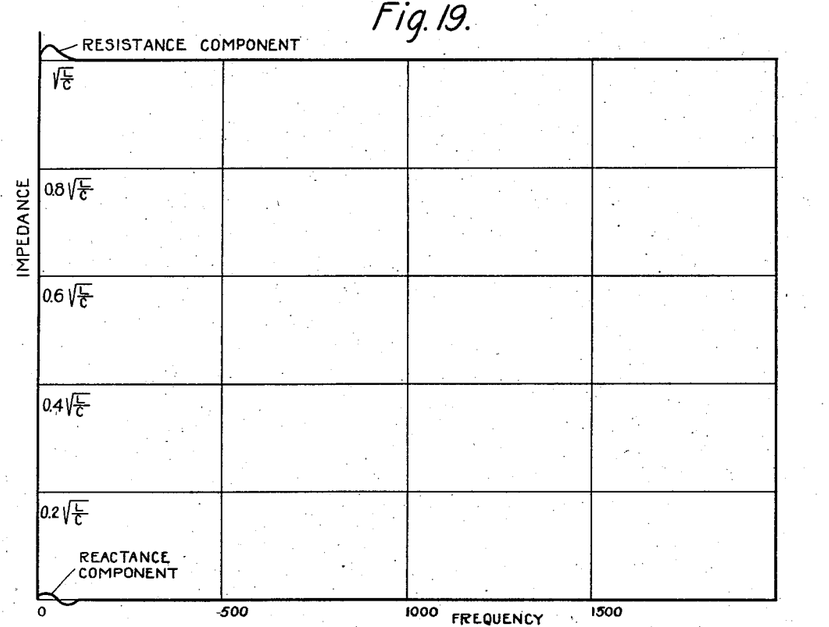
Figs. 19 and 20 show the impedance characteristic curves of the system of Fig. 17.
Figure 20:
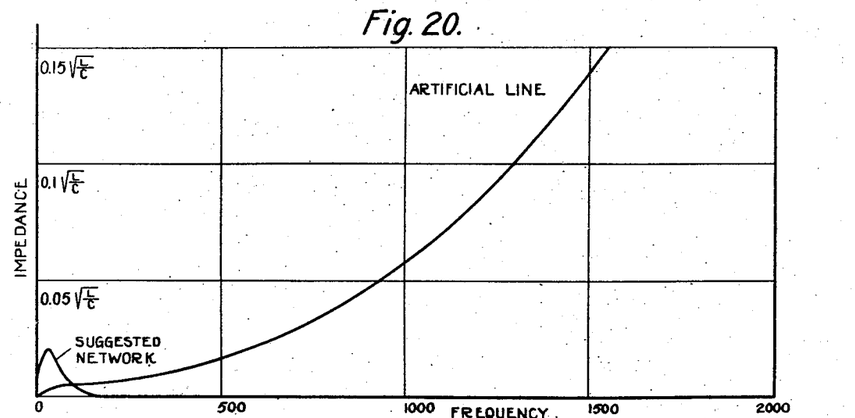

When the four meshes of this network shown in the figure are connected in parallel with the cable the impedance of the combination is that shown in arbitrary units in Fig. 19. It will be seen that this impedance is very nearly a pure resistance. In order to gauge more clearly the actual magnitude of the departures from the desired impedance, these departures are plotted in Fig. 20. In the same figure is shown the departures of the common type of artificial line from the impedance of the smooth line which it is designed to simulate.

In considering these curves, attention should be directed to the fact that the artificial line is taken to be infinitely long, and is so divided that each section represents 4.08 miles of cable, so that hundreds of sections would be necessary to represent a trans-Atlantic cable; whereas the impedance corrective network has only four meshes as shown in Fig. 6. In spite of this fact, the departures for the latter are larger than those of the former at only a small range of frequencies. For telephonic frequencies the four-mesh network is already much superior to the artificial line. Furthermore, the range of inferiority could be cut down to any desired extent by adding sections to the network of Fig. 6 in accordance with the above theory.

This method of duplexing presents several advantages over the method in common use of which the following may be mentioned:

(1) In the example considered the theoretical balance obtained from the proposed system, when only four sections of network are used, is better than the theoretical balance from an artificial line of an infinite number of four mile sections, except at frequencies below 100 cycles.

(2) This limit (100 cycles) can be reduced very materially by adding additional sections. From a purely theoretical standpoint it can be reduced to any frequency desired.

(3) A very desirable type of frequency selectivity is introduced at both the receiving and sending ends. That is, the balancing network is, to a considerable extent, a distortion corrective network as well.

(4) The system makes the use of condensers in the finite bridge arms purely optional, in the case of cable transmission. The cable is automatically protected from electrostatic potentials resulting from accumulated charges.

Telephone repeater balance can be obtained in one of three ways: (a), by the scheme shown in Fig. 21 in which figure A, A' are networks simulating the impedances of the line L, L' respectively; or, (b), by the scheme shown in Fig. 22 in which B, B' are impedance corrective networks, which, when combined in parallel with the lines L, L', reduce their impedances to R, R', respectively; or (c), by the scheme shown in Fig. 23, in which C, C' are impedance corrective networks, which, when combined in series with the lines L, L', reduce their impedances to R, R', respectively.

After what has already been said, it is at once obvious that we have designed networks for either of these balancing schemes.

The first scheme, which is the one generally in use, requires networks of the types developed and discussed under the heading "Balancing networks," in connection with equations (12) and (13). As was said in connection with the discussion of those equations, the networks to which they lead may be made to simulate the lines as accurately as we may desire by the use of a suitably large number of sections.

The second scheme utilizes the impedance corrective network defined by equations (15); and the third scheme that defined by equations (14). To each of these schemes, neither of which has heretofore been recognized as operative, the same remark applies,—that is, we may make the balance as nearly absolute as we may desire by choosing the number of sections sufficiently large.

In certain of the appended claims the networks of this invention are specifically referred to as two terminal networks, thereby distinguishing from such networks of the form of a wave filter, for example, which has four terminals, two for incoming potentials and two for outgoing potentials.

In further explanation of certain claims which follow, attention is called to the fact that even in those cases in the main body of the specification where it has been more convenient to speak of expanding the admittance in a continued fraction, the result obtained was an expansion of the impedance in such a fraction, as may easily be seen by equating to the impedance unity divided by that continued fraction which represented the admittance. Furthermore, in every such expansion the successive partial denominators are bi-linear functions of the quantity $p$, (that is, functions of the form $$\frac{\alpha p + \beta}{\gamma p + \delta},$$

where $\alpha$, $\beta$, $\gamma$ and $\delta$ are numerical constants), the partial denominators corresponding alternately to the impedances to be assigned to the series portion of a network section, and to the admittance to be assigned to the shunt portion of a network section. The sole aim of the expansion is to produce successive partial denominators of this form, by which the impedances themselves are uniquely determined.

What is claimed is:

1. A network having a desired impedance characteristic comprising a plurality of sections, each having an impedance which varies from section to section in accordance with the terms of a continued fraction so that each section when taken in connection with the preceding sections more closely approximates the desired impedance.

2. A network comprising a plurality of sections, the impedance elements of which have values differing from section to section and corresponding to the coefficients $a_0$, $a_1$, $a_2$, etc., of the expansion of the impedance to be simulated into a continued fraction of the form $$a_0 + \cfrac{1}{a_1 p + \cfrac{1}{a_2 + \cfrac{1}{a_3 p + \cfrac{1}{a_4 + \cdots}}}}$$

wherein $p$ equals $2\pi\sqrt{-1}$ times the frequency.

3. A corrective network having only two terminals for connecting to a transmission circuit, and a plurality of sections, each having impedance elements effectively in shunt to said terminals and impedance elements in series with said terminals and the other sections, the impedance elements of each section being similar to the impedance elements of the other sections but having values differing from section to section.

4. A corrective network having only two terminals for connecting to a transmission circuit, and a plurality of sections, each having like impedance elements effectively in shunt to said terminals and impedance elements in series with said terminals and the other sections, said impedance elements being similarly arranged in said sections but having values differing from section to section.

5. A corrective network of a plurality of sections, said sections having like impedances similarly arranged, but of values differing from section to section, each of said sections comprising a resistance, and a reactance in shunt.

6. A corrective network of a plurality of recurring sections comprising impedances substantially differing in value from section to section, each of said sections comprising a condenser shunted by a resistance.

7. In combination, a transmission line and an electrical network comprising a plurality of sections, said sections having like impedances similarly arranged but differing substantially in their respective values from section to section, said network at one end being connected to said line and at the other end being closed upon itself.

8. In combination, a transmission line and an electrical network comprising a plurality of sections, said sections having like impedances similarly arranged but differing substantially in their respective values from section to section, said network at its end having the impedances of the smallest values being connected to said line and at the other end being closed upon itself.

9. A network comprising a connecting line, a plurality of similar impedances connected in series in said line, a plurality of similar impedances in shunt to said line, thereby forming a network of a plurality of similar sections, said series impedances having values differing from section to section, and connections at only one end of said network to a transmission line said network being closed upon itself at the other end.

10. A network of a plurality of sections similar in impedance character but having substantially different impedance values in each of a plurality of sections, said network being closed upon itself at one end and having connecting terminals at the other end.

11. In combination, a transmission line and a network of such an impedance that the combined impedance of said line and said network approximates a pure resistance, said network comprising a plurality of sections having similar impedance arrangements.

12. In combination, a transmission line and a network of such an impedance that the combined impedance of said line and said network approximates a pure resistance, said network comprising a plurality of sections having similar impedance arrangements, the impedances in said sections having values differing from section to section.

13. In combination two line sections, a two way repeater circuit between said sections,—one of said line sections having an impedance with a resistance and a reactance component,—an artificial balancing line for said last mentioned section comprising a pure resistance only,—and means between said last mentioned section and said artificial line whereby the combined impedance of said means and said last mentioned line section approximates a pure resistance.

14. In combination two line sections, a two way repeater circuit between said sections,—one of said line sections having an impedance with a resistance and a reactance component,—an artificial balancing line for said last mentioned section comprising a pure resistance only,—and means comprising a network of a plurality of sections having like impedances but with values differing from section to section, between said last mentioned section and said artificial line whereby the combined impedance of said means and said last mentioned line section approximates a pure resistance.

15. A circuit for changing the impedance $Z_n$ of an electrical device to $\bar{Z}$, said circuit comprising a section the impedance of which is a first approximation of $$\frac{Z_n \bar{Z}}{Z_n - \bar{Z}}$$

and a section connected to said first section for more closely approximating $$\frac{Z_n \bar{Z}}{Z_n - \bar{Z}}.$$

16. A network, the impedance of which has a value approximating to a function of two impedances, said network having a plurality of sections, the impedance elements of which have values corresponding to the terms of a continued fraction found by expanding said function, said expansion being carried out to the desired approximation.

17. A network the impedance of which has a value approximating to a function of two impedances, said network having a plurality of sections, the impedance elements of which have values corresponding to the terms of a continued fraction formed by expanding said function, said expansion being carried out to the desired approximation, and a terminating impedance for said network having a value approximating the impedance of the remainder of an infinite number of sections corresponding to the terms of said fraction if expanded to infinity.

18. A corrective network having two terminals, and comprising a plurality of sections, each section having like impedances differing in value from section to secton, each of said sections comprising a resistance effectively in shunt to said two terminals.

19. In combination, two line sections, a two-way repeater circuit between said line sections, one of said line sections having an impedance with a resistance and a reactance component, an artificial balancing line for said last mentioned section comprising a pure resistance only and impedance means between said last mentioned section and said artificial line of such impedance that the combined impedance of said means and said last mentioned line section approximates a pure resistance substantially equal to the pure resistance of said artificial balancing line.

20. In combination two line sections, a two way repeater circuit between said sections, one of said line sections having an impedance with a resistance and a reactance component, an artificial balancing line for said last mentioned section comprising a pure resistance only, and means between said section and said artificial line and in shunt to said section whereby the combined impedance of said means and said section approximates a pure resistance.

21. A two terminal corrective network of a plurality of sections having like impedances but with values differing from section to section and a terminating impedance for said network at the end thereof opposite said terminals.

22. A network comprising a plurality of sections, impedance elements in successive sections having values determined by the coefficients of $p$ in the successive pairs of partial denominators of the expansion of the impedance to be simulated into a continued fraction, the successive partial denominators of which are bilinear functions of $p$, wherein $p = 2\pi \sqrt{-1}$ times the frequency.

23. In combination, a network having an impedance with a resistance component and a reactance component, means having a substantially pure resistance only, and a second electrical network comprising a plurality of sections in circuit with the first network and said means and having such an impedance that the combined impedance of said networks approximates a pure resistance substantially equal in value to the resistance of said means.

In witness whereof, I hereunto subscribe my name this 9th day of June A. D., 1921.

THORNTON C. FRY.